United States Patent [19]

Smith et al.

[11] 4,395,233

[45] Jul. 26, 1983

[54] DUAL FLOW HEATING APPARATUS

[75] Inventors: Robert C. Smith, Vergennes; A. Benns Cox, II, North Ferrisburg, both of Vt.

[73] Assignee: G. S. Blodgett Co., Inc., Burlington, Vt.

[21] Appl. No.: 276,182

[22] Filed: Jun. 22, 1981

[51] Int. Cl.³ .......................... F27B 3/22; A21B 1/00; F24C 15/32

[52] U.S. Cl. .................................... 432/176; 99/447; 126/21 A; 219/400

[58] Field of Search ............. 126/21 A; 432/176, 177, 432/200, 202; 99/447; 219/400; 416/184, 199

[56] References Cited

U.S. PATENT DOCUMENTS

| | | | |
|---|---|---|---|
| 1,717,115 | 6/1929 | McCann | 432/176 |
| 2,039,429 | 5/1936 | Lydon | 432/176 |
| 2,392,113 | 1/1946 | Anderson | 416/184 |
| 2,549,208 | 4/1951 | Kice, Jr. | 416/184 |
| 3,080,105 | 3/1963 | Merz | 416/184 |
| 3,148,674 | 9/1964 | Boardman et al. | 126/19 |
| 3,587,557 | 6/1971 | Henderson et al. | 126/91 A |
| 3,698,377 | 10/1972 | Smith | 126/91 A |

FOREIGN PATENT DOCUMENTS

| | | |
|---|---|---|
| 2949816 | 7/1980 | Fed. Rep. of Germany . |
| 2919762 | 11/1980 | Fed. Rep. of Germany . |

OTHER PUBLICATIONS

"Soviet Inventions Illustrated" Week E03, 3 Mar. 1982, Section J09Q74Q76Q77S.
Soviet Application 819,521 Published 10 Apr. 1981.

*Primary Examiner*—John J. Camby
*Attorney, Agent, or Firm*—LeBlanc, Nolan, Shur & Nies

[57] ABSTRACT

A forced air circulation heating apparatus in which an air stream is heated at a first location in a conduit means and transported to a second location within the apparatus by the conduit means and is forced into a heating compartment and mixed with a recirculated forced air flow within the compartment. A valve or controller means can be used to vary the proportions of the heated air stream and the recirculated forced air flow which are combined within the heating compartment. The air conduit and the heating compartment can have a common wall thereby the heated air stream indirectly heats the heating compartment. A dual flow impeller fan is used to move the heated air stream and to establish the recirculated forced air flow within the heating compartment. The fan operates with a single electric motor. The heating compartment is vented to a flueway.

37 Claims, 5 Drawing Figures

DUAL FLOW HEATING APPARATUS

BACKGROUND OF THE INVENTION

The present invention relates to heating or cooking apparatus in which heated air is forceably circulated in order to provide efficient and even heating of the material being heated within a heating compartment. Apparatus of this type are referred to in the trade as "convection ovens". More particularly, the forced air apparatus of the present invention establishes increased flexibility by providing means to generate and use both a directly heated air stream and a recirculated air flow both within the oven. The heated air stream also provides indirect heat transfer into the oven.

Ovens showing forced air recirculating impeller fans are set forth in U.S. Pat. Nos. 3,118,436 to R. T. Keating, 3,148,674 to R. T. Boardman et al, and 3,411,493 to G. R. Everson et al. Each of these patents show an oven compartment in which air is forceably recirculated by an impeller fan located in the rear portion thereof. Each of these ovens is provided with a gas combustion heating means for heating the main oven compartment.

Some of the prior art has specified that the heating compartment should have a particular exterior configuration with respect to the flow patterns established by the impeller fan such as U.S. Pat. No. 3,463,138 to Lotter et al. Yet other prior art of this type has provided for various cooling channels in order to cool the impeller motor as in U.S. Pat. No. 3,707,145 to Anetsberger et al.

Other prior art provides for flow-through of the heated air rather than recirculation of the air within the oven heating compartment. Representative patents of this type which have fan means for drawing the heated air through the heating compartment are: U.S. Pat. Nos. 3,437,085 to Perry; 3,973,551 to Caselani et al; and 4,108,139 to Gilliom et al. The fan means in these patents provide for movement of heated air through the oven compartment in order to heat the material being cooked or treated within the oven. The air flow patterns established in these patents provide for the contacting of hot combustion gases with an air stream which is drawn through the oven compartment walls. The contact between the combustion gases and the air stream drawn through the oven compartment occurs outside of the oven compartment. After the mixing of the flow-through oven air with the combustion gases the combined air stream is redirected through the oven heating compartment walls. These oven apparatuses do not provide for the continual recirculation of air within the heated chamber by a fan placed therein but rather require a flow-through of heated air. In these ovens there is no provision for controlling the relative proportions of the hot combustion gases and the heated air stream flowing through the oven compartment.

A problem encountered in these flow-through type ovens with food broiling and roasting is that the air flow stream exiting from the heating compartment contains various organic matter given off by the food as it is heated, particularly grease. This matter can then deposit on the air conduit surfaces and constitutes operational and safety hazards.

Other patents provide for recirculation of heated air in an oven compartment as well as a ventilating flow of air through other portions of cooking ranges in which the oven compartments are placed. Representative patents of this type are U.S. Pat. Nos. 4,071,738 and 4,071,739 both to Jenn et al. Another patent not showing recirculated air within the oven compartment but providing for ventilating air flow is U.S. Pat. No. 3,587,555 to Cerola.

The above-referred-to patents do not show the primary heating of air at one remote location within the oven apparatus, circulation of the heated air to the oven compartment through conduit(s) which enable indirect heating of the oven compartment, and contacting of the heated air stream with recirculated air within the heating compartment in order to form a dual primary heated air/recirculated air flow within the heating compartment. These patents do not simultaneously provide for the direct introduction of heated air into the heating compartment and recirculation within the compartment whereby matter given off by the heated food is confined to the heating compartment and the vent conduit(s) downstream from the heating compartment. The prior art also does not show a dual function impeller fan for providing the motive force for moving both the heated air stream and the recirculated heating compartment air flow which also functions as a mixing fan so that only a single motor can be used for the dual functions.

SUMMARY OF THE INVENTION

A forced air circulation heating apparatus is provided in which an air stream is heated at a first location in a conduit means and then transported to a second remote location by the conduit means and is forced into a heating compartment in which an air flow fan operates to establish a recirculated air flow internally within the heating compartment and to mix the heated air stream with the recirculated air flow. An air controller means is also provided to vary the proportions of the heated air stream and the recirculated air flow within the heating compartment. The heating apparatus can be preferably constructed so that the air conduit and the heating compartment have a wall in common whereby the heated air stream indirectly heats the heating compartment during circulation of the heated air to the air flow fan. The heated air stream then enters directly into the heating compartment to provide a direct heating effect in addition to the indirect heating.

The air flow fan comprises two sets of impeller blades positioned on either side of a rotating centrally disposed circular plate which provides for the forced intake of two air streams, one flowing along the fan axis in a first direction and a second air stream flowing along the fan axis in the opposite direction both moving inwardly toward the center plate. In this manner, the air flow fan provides motive force for both the heated air stream and the recirculated air flow within the heating compartment and also provides for mixing of the same. The air flow fan is located in the heating compartment and is positioned between one of the walls of the heating compartment and a divider panel spaced therefrom which is provided with a central aperture for allowing the recirculated air flow to enter the air flow fan from internally within the heating compartment.

The controller means for varying the proportions of the heated air stream and the recirculated air flow within the heating compartment can be arranged to alternately block a heat collector duct or a flue through which variable proportions of the heated air stream can exit from the heating apparatus.

It is therefore an object of the present invention to provide a forced air circulation heating apparatus in which a heated air stream can be conducted into a heating compartment within which an air flow means is contained for establishing a recirculated air flow.

Another object of the present invention is to provide a forced air circulation heating apparatus in which the relative proportions of the heated air stream and the recirculated air flow can be adjusted prior to mixing.

Another object of the present invention is to provide a forced air circulation heating apparatus of the above described type in which the air conduit for the heated air stream and the heating compartment within which the reirculated air flow is established have a common wall for providing indirect heating of the heating chamber by the circulated and heated air stream in addition to the direct heating of the heating compartment by the inflow of the heated air stream.

Yet another object of the present invention is to provide improvements in forced air circulation heating apparatus of the above described types whereby even heating without hot sports is attained.

Another object of the present invention is to provide an air flow fan which is rotatably positioned within the heating compartment and which is constructed of a shaft collar and a connected circular center plate which has two sets of impeller blades affixed to the opposite peripheral edge portions thereof for impelling and mixing air streams which flow inwardly along the fan axis in opposite directions toward the center of the plate.

Specific preferred embodiments of the invention will be described below with reference to the appended drawing figures.

DESCRIPTION OF THE PREFERRED EMBODIMENTS

Figure 1:
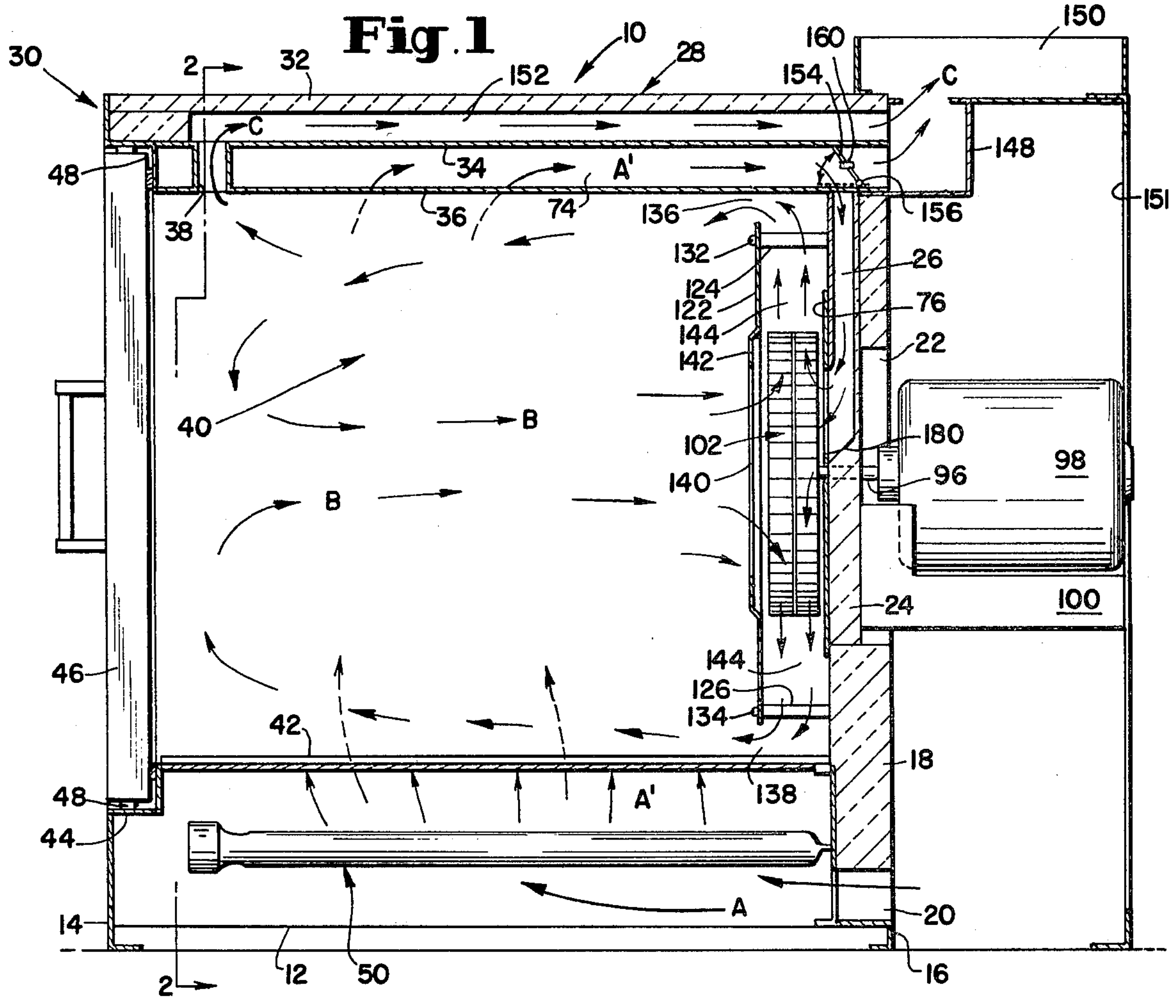
FIG. 1 is a cross-sectional schematic view of the heating apparatus of the present invention showing the heated air stream conduit and the recirculated air flow motion within the heating compartment.
Figure 4:
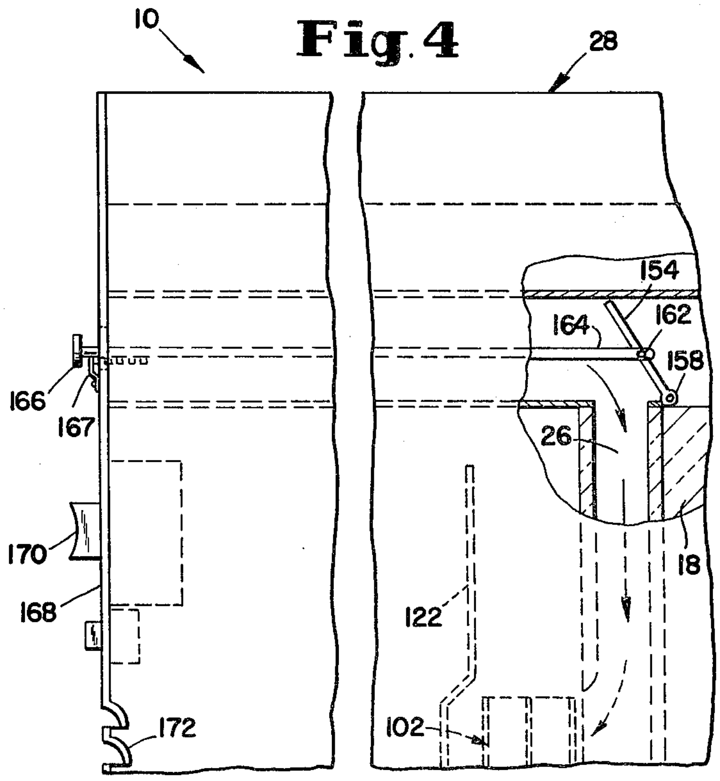
FIG. 4 is a fragmentary schematic view of the operator means for the controller means which determines the relative proportion of the heated air stream and the recirculated air flow within the heating compartment.
Figure 2:
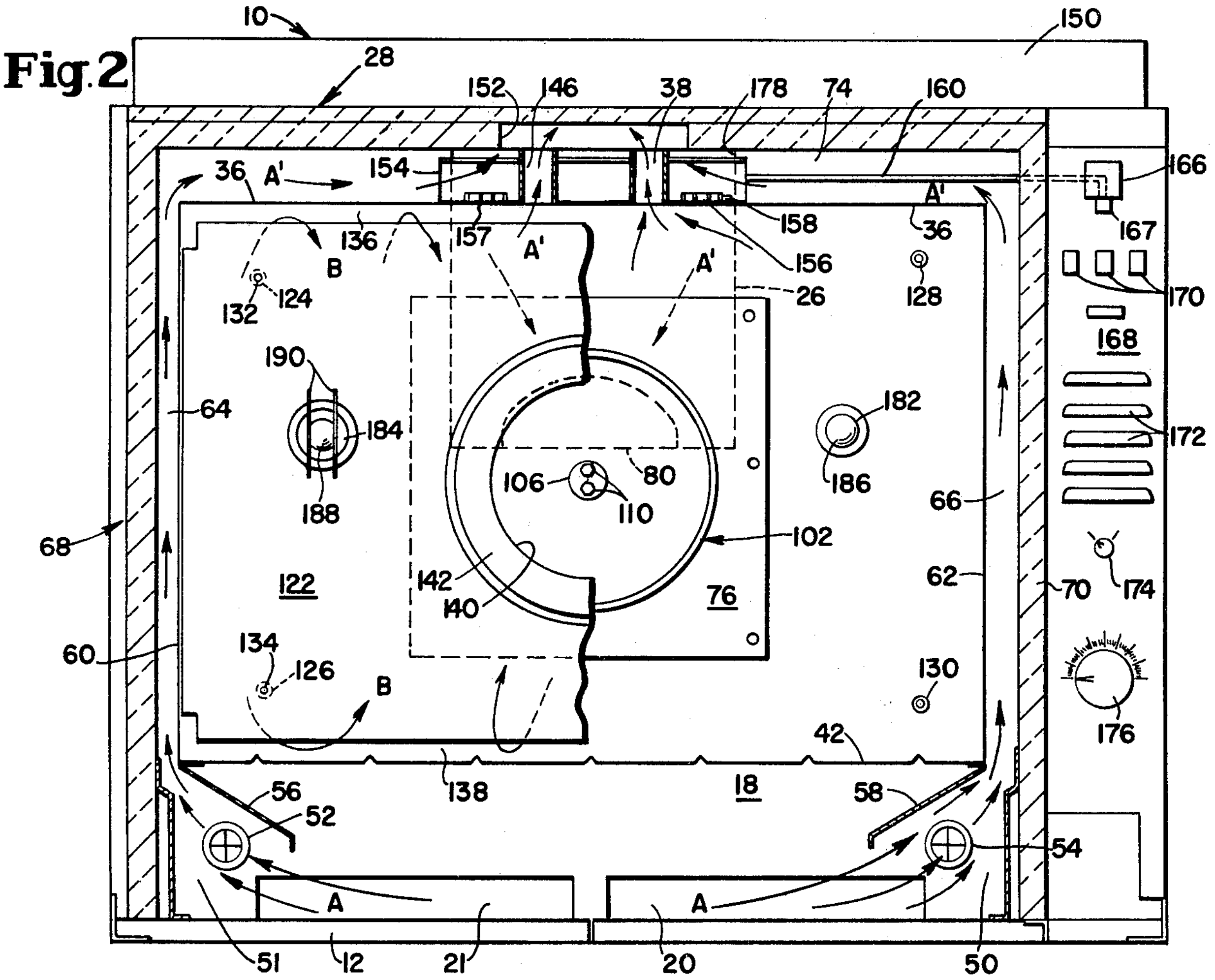
FIG. 2 is a front sectional view of the heating apparatus shown in FIG. 1.

Referring to FIGS. 1, 2 and 4, a forced air apparatus 10 is shown with a bottom wall 12 which has a front foot element 14 and a rear foot element 16 which extend across the width of the heating apparatus. An insulated rear wall 18 is connected to bottom wall 12 at the rear portion thereof and is formed with intake air openings 20 and 21 located toward the bottom thereof and a centrally disposed access opening 22 which is covered by a removable insulated blocking member 24. A heat collector duct 26 is formed in the upper front portion of the rear wall 18 and in the upper portion of the blocking member 24.

A top wall structure 28 is connected to the top portion of the rear wall 18 and extends forwardly therefrom to a front member 30. The top wall structure is formed of an insulated upper panel 32, a divider panel 34 which is spaced parallel thereto and a lower compartment top panel 36. An exit air vent 38 is formed in the front portion of top wall structure 28 so that air can pass from the position immediately below the top wall structure into the space between panels 32 and 34. A heating compartment 40 is formed within the heating apparatus 10 by the compartment top panel 36, the rear wall 18 and a bottom compartment wall 42. The front edge of the compartment bottom wall 42 is attached to a bracket member 44 in which a front door is pivotally mounted on a pivot rod 48. The top edge of door 46 rests against the recess portion 48 of front member 30. Compartment bottom wall 42 is spaced above bottom wall 12 to form burner spaces 50 and 51 in which are positioned burner tubes 52 and 54 which extend from a front portion of the burner spaced to the rear wall 18. These tubes 52 and 54 can be designed for burning natural gas, propane, butane, producers gas, etc.

As shown in FIG. 2, deflector panels 56 and 58 are positioned immediately above burner tubes 52 and 54 respectively in order to direct the intake air stream A in a closely confined space about the burner tubes so that the gas flames are directed upwardly. Also as shown in FIG. 2, the heating compartment 40 is completed by side walls 60 and 62 which extend upwardly from the compartment bottom wall 42 to the top panel 36. After passing across the burner tubes 52 and 54, the intake air stream consists of a heated air stream A' containing the combusted gas products and which is then circulated through side air conduits 64 and 66 which are formed between the heating chamber side walls 60 and 62 and the associated outer housing walls 68 and 70 respectively. These outer housing walls extend between the heating apparatus bottom wall 12 and the top wall structure 28 of the outer housing and are insulated.

Figure 3:
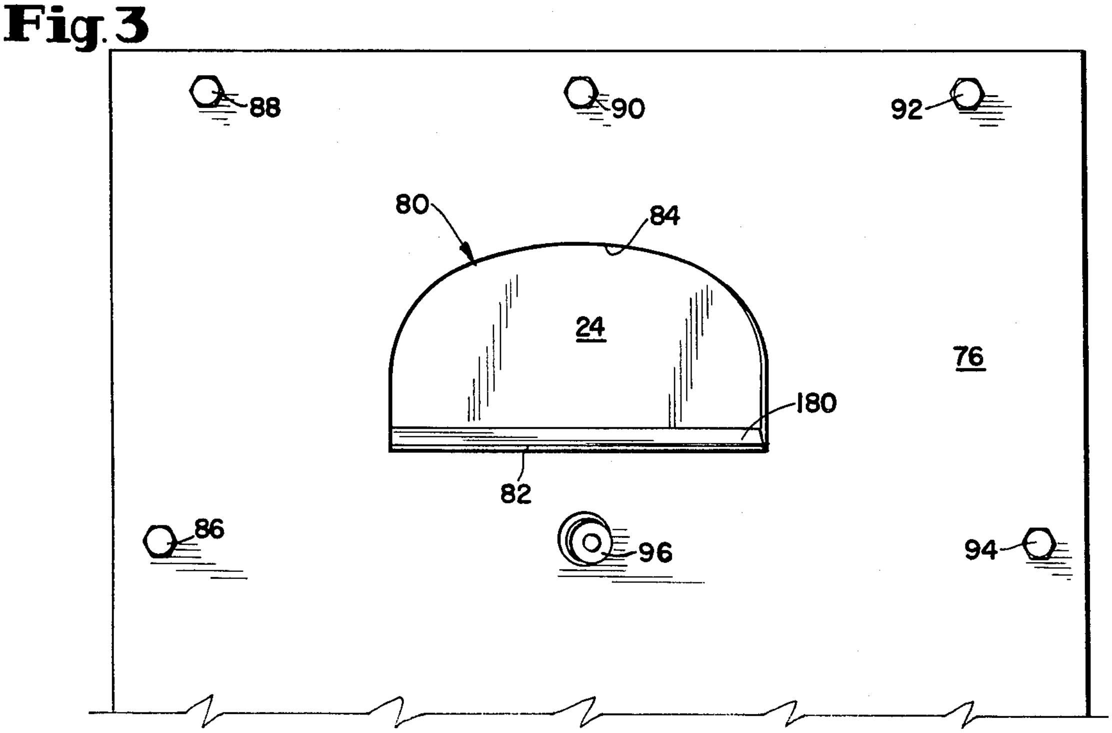
FIG. 3 is a detail of the heat collector duct opening located in the heating compartment wall adjacent to the air flow fan.

The intake air opening 20 provides for intake of air stream A across burner tube 54. The similarly configured intake air opening 21 provides for an intake air flow across burner tube 52 in order to establish a second air stream. The two heated air streams A' are then forced upwardly through the air conduits 64 and 66 where they flow inwardly toward the center of a top air conduit 74 and toward the rear thereof as shown by FIG. 1. These two converging heated air streams are then combined and forced through the heat collector duct 26. The heated air stream exits from the duct 26 which passes through the blocking member 24 positioned within access opening 22 in the rear wall 18. A cover plate 76 is arranged to cover the end of the duct 26. An aperture 80 is provided in cover plate 76 with a straight lower portion 82 and an arcuate top portion 84 as shown in FIG. 3. Cover sheet 76 is arranged to be connected to block member 24 by a series of hex bolts or screws 86–94.

Blocking member 24 is arranged to accommodate the armature shaft 96 of an electric motor 98 which is in turn supported by a carriage 100 which is rigidly affixed to the rear most side of blocking member 24.

Figure 5:
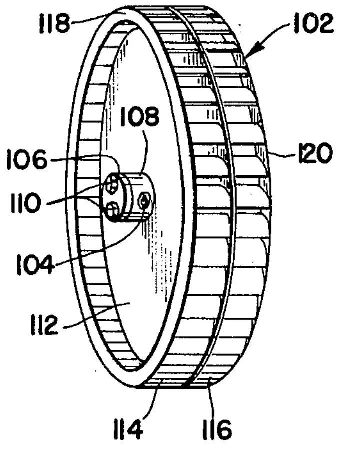
FIG. 5 is a schematic perspective view of the air flow fan of the present invention.

An impeller air flow fan is removably attached to the armature shaft at the opposite end thereof by a radial set screw 104. A fan hub 106 is retained on the armature collar 108 by a series of fasteners bolts 110. As shown in FIG. 5 impeller fan 102 is formed of a central circular plate 112 which has a first and a second set of impeller blades 114 and 116 attached perpendicularly about its peripheral edge on both sides thereof. A retainer ring 118 is provided for impeller blade set 114 and a similar retainer ring 120 is provided for the second set impeller blades 116 in order to stablize the ends of the impeller blades. Sheet metal blades rather than cast blades can be successfully employed. The circular plate 112 is rigidly affixed at the center portion thereof to the shaft collar 108.

A divider panel 122 is spaced from the rear wall 18 by a series of spacer members 124 and 126 as shown in FIG. 1 which have opposing spacer rods 128 and 130 respectively as shown in FIG. 2. Fastener bolts 132 and 134 are shown for securing divider panel 122 to the spacer rods. The divider panel 122 is rectangular in shape and extends from close to the compartment side walls 60 and 62 across the width of the heating compartment 40. Air flow channels 136 and 138 are formed between the top edge of the divider panel and the compartment top panel 36 and the bottom edge of the divider panel 122 and the compartment bottom wall 142, respectively. A centrally disclosed circular aperture 140 is formed in divider panel 122 by a raised annular portion 142. The axis of the aperture 140 is aligned with the fan hub 106.

When front door 46 is in closed position and the impeller fan 102 is rotated by electric motor 98, a recirculated air flow B is established within the heating compartment 40 by means of the impeller blade set 114 causing air to flow centrifugally away from the fan into an air mixing space 144 which is formed between divider panel 122 and rear wall 18. The air flowing centrifugally away from the impeller fan is forced through the upper and lower flow channels 136 and 138 into a toroidal circulating pattern as illustrated in FIG. 1 in which the return air flow passes through circular aperture 140 in divider panel 122 and into the rotating impeller fan. The rotation of impeller fan 102 also forces the flow of the heated air stream A' through the heat collector duct 26 and through aperture 80 in coverplate 76. The heated air stream A' is impelled centrifugally outwardly from the impeller fan 102 by the impeller blade set 116 and is mixed with the recirculated air flow B in the air mixing space 144. In this manner the rotation of the impeller fan 102 enables the centrifugal forcing of the intake of both air streams. The first air stream flows along the fan shaft 96 and the second air stream is the entering portion of the recirculated air flow B and enters along the fan from within the internal heating compartment 40. The flow of the two air streams is inwardly toward the circular center plate 112. In this manner, the impeller fan 102 provides the motive force for the flow of the heated air stream A', the intake of the ambient air stream, and the recirculation of the air flow B within the heating chamber 40. Impeller fan 102 also provides the motive force for driving the exit air C through the air vents 38 and 146 as shown in FIG. 2.

As seen in FIG. 1, the rearmost portion of air conduit 74 is vented to a flue box 148 which is positioned in a flue plenum 150. The air vents 38 and 146 are connected to a top flueway 152 which is also in communication with flue box rear 148 and flue plenum 150, at the rearmost portion thereof. A rear frame 151 provides support for the plenum 150.

A flap valve 154 is positioned to cover the opening of the heat collector duct 26 by pivotal movement about mating hinge loops 156 and 157 which are secured in position by a hinge pin 158. The dimensions of the flap valve 154 are such that in the fully opened vertical position the rearmost portion of the top air conduit 74 is substantially blocked from communication with the flue box 148, but a small air flow around the ends of the flap valve is allowed. The flap valve 154 can be adjusted to maintain any position between fully closed position illustrated in phantom lines in FIG. 1 and the upright vertical position in order to provide for channeling substantially all of the heated air stream A' into the heating compartment 40 via the operation of impeller fan 102. Thus, variable proportions of the heated air stream can be drawn into the heat collector duct 26 depending upon the need thereof in the heating compartment 40 as a source of direct heat.

The flap valve 154 is pivoted by movement about the hinge pin 158. A crank operator 160 is rigidly affixed to the side end of the flap valve 154 and is connected by pivot pin 162 to the rearmost end of a reciprocal operator rod 164 which has a manual push-pull knob 166 attached to the front most end thereof as shown in FIG. 4. A series of teeth on the undersurface of the rod 164 coact with a spring finger 167 to adjustably hold the flap valve 154 in various radial positions. The manual knob 166 protrudes on the front side of a control panel 168 which is shown in FIGS. 1 and 4 with a series of operator buttons 170 and internally struck cooling louvers 172. Other controllers and meters such as temperature dial 176 can be positioned in the control panel as well.

In operation, the movement of control rod 164 by the operator knob 166 will transmit the reciprocal motion through the crank operator 160 to cause the flap valve 154 to assume various radial positions.

As seen in FIG. 2, the rearmost portion of the air conduit 74 enters flue box 148 through a central opening 178 and air stream C exits through the rear portion of the flueway 152.

The heat collector duct 26 located within rear wall 18 and blocking member 24 has a sloped bottom portion 180 as shown in FIGS. 1 and 3. Electrical fixtures 182 and 184 can be secured to rear wall 18 for the provision of light sources 186 and 188 respectively. Protective bars 190 can also be attached to the divider panel 122 in order to protect the light sources.

In operation, the combustion of gases in the space about and above the burner tubes 52 and 54 creates a mixture of air and gas combustion products containing principally water vapor and carbon dioxide. These combustion products are entrained in the air stream A' and are then drawn through the heat collector duct 26 and mixed with the recirculated air flow B in the compartment 40 by the impeller fan 102. Thus, the moisture and carbon dioxide levels within the heating compartment 40 can be controlled by adjustment of the radial positions of the flap valve 154 in order to give the heating apparatus operator a wide range of freedom in the choice of food preparation conditions and heat selections. Some foods require high temperatures with very dry air, other foods such as bakery products and pizza require relatively moist air. There is a wide range of requirements between these two extremes. The operation of the heating apparatus 10 permits the operator to select moist versus dry air at any time, prior to and during the bake-cook cycle performed within the heating apparatus. Generally, heating compartments 40 of the type described above are referred to in the trade as bake-cook compartments and the heating apparatus are normally termed ovens.

The operator means described with reference to the operator rod 164 and crank operator 160 can be replaced by bevel gears and, a rotatable operator rod arrangement which controls rotation of a hinge pin which is rigidly affixed to the flap valve and hence pin rotation will establish different radial positions for the flap valve 154. Also, the flap valve may be replaced by a slidable or a rotable vane in order to control the relative flows of the heated air stream A' and the internal air flow B.

The operation of heating apparatus 10 allows a greatly increased heated air stream velocity and volumetric flow which results in higher energy efficiency for the use of the consumed combustion gas. Heating of the products within the heating compartment 40 is greatly accelerated and the heat can be maintained in the bake-cook compartment at higher levels when required. The delivery of the high temperature heated combustion products from the burner spaces 50 and 51 to the bake-cook compartment 40 is provided without interference with the normal recirculated air stream created by the impeller 102 within the bake-cook compartment 40. The temperature of the flue gasses leaving the heating apparatus in the flue plenum 150 are equal or lower than the bake-cook compartment temperatures, thus signifying that the heat has been optimally utilized in the heating compartment, whereby increased efficiency is obtained. The energy efficiency gain by the heating apparatus 10 is on the order of 40% above a conventional convection oven in which the direct inflow of a heated air stream A' is not provided. A series of comparison tests between the heating apparatus 10 and a conventional convection oven which does not provide for the direct inflow of a heated air stream A' was carried out according to American Gas Association, Inc. Standards (USAS Z21.28-1967) and the results obtained are set forth in Table I. The average heating rate was determined by recording the time required to elevate the heating compartment temperature from 100° F. to 400° F. and dividing the 300° F. temperature increase by the recorded time. The minimum allowed heating rate according to these standards is 7° F. per minute. The maintaining rates refer to the maintenance of an equalibrium oven temperature of 330° F. above room temperature with equivalent insulated housing walls. This standard is set to be maintenance with not more than 2,200 Btu per hour per cubic foot of heating compartment space.

TABLE I

HEATING AND USE COMPARISONS

| | Present Heating Apparatus | Conventional Convection Oven |
|---|---|---|
| 1. Heating Capacity, °F. per minute | 33 | 13.04 |
| 2. Maintaining Rate, Btu/hr/ft.$^3$ | 1565.84 | 2388.02 |
| 3. Food Products, ft$^3$ gas consumed | | |
| cake baking | 9.45 | 16.23 |
| Pie baking | 20.36 | 32.70 |
| Potato baking | 35[1] | 49.62 |

[1]average of three consecutive bakes.

The consumed gas figures set forth for the food products show differences in gas consumption and hence energy efficiency for cooking the specified foods for the same amounts of time at the same temperatures. As can be seen from the data presented, the heating apparatus 10 described and claimed herein allows significant energy efficiency advantages with respect to the conventional convection-type ovens.

The gas burner tubes 52 and 54 can be replaced by electrical resistance calrods. In this modification the heated air will provide indirect heat exchange into the heating compartment 40 prior to entry through the heat collector duct 26, but no greases or other matter given off during the bake-cook processes carried out in apparatus 10 will be present in side conduits 64 and 66 or in top air conduit 74. These side conduits 64 and 66 can be used to position calrods so that the total calrod area can be increased which will lower the watt density. This provides more even heating and eliminates hot spots in the heating compartment. The proportion of direct heat admitted into the heating compartment is controllable in the manner above described.

While apparatus 10 has been mainly described with respect to a heating apparatus for food other uses such as drying lacquer and paint and water-based latex finishes are possible, particularly when drying under controllable humidity conditions is deemed important.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heated air stream from said heater means into said heating compartment at a second location, an air fan means located in said heating compartment and having a first means operable to forcibly draw said heated air stream into contacting therewith at its entry into said heating compartment and having a second means operable to establish a recirculated forced air flow internally within said heating compartment without entry of said internal forced air flow into said air conduit, said first and second air fan means enabling mixing of said heated air stream with said internal forced air flow, and vent means formed in said heating compartment to enable the outflow of heated air from said heating compartment.

2. The improvement according to claim 1, wherein said associated air conduit means and said heating compartment have at least one wall in common for enabling indirect transfer of heat from said air conduit means into said heating compartment.

3. The improvement according to claim 1, wherein said heater means is a gas combustion element, and said air stream transported from said heater means to said second location contains gas combustion products, and wherein said heated air stream is mixed with said recirculated forced air flow solely within said heating compartment by said air flow means.

4. The improvement according to claim 1, wherein said heater means is an electric resistance element, and wherein said heated air stream is mixed with said recirculated forced air flow solely within said heating compartment by said air flow means.

5. A forced air heating apparatus having a heating compartment and an associated air conduit means connected thereto, comprising heater means for heating an intake ambient air stream drawn into said conduit means at a first location, said conduit means enabling transport of a heated air stream from said heater means into said heating compartment at a second location, an air fan means located in said heating compartment and having a first means operable to forcibly draw said heated air stream into contacting therewith at its entry into said heating compartment and having a second means operable to establish a recirculated forced air flow internally within said heating compartment without entry of said internal forced air flow into said air conduit, said first and second air fan means enabling mixing of said heated air stream with said internal forced air flow, and vent means formed in said heating compartment to enable the outflow of heated air from said heating compartment.

6. The heating apparatus according to claim 5, further comprising an outer housing formed of a plurality of connected side, bottom, top and rear walls, said outer housing arranged about said heating compartment in a manner to form an associated air conduit between at least one of the walls of said heating compartment and said outer housing, and said air conduit enabling transport of a heated air stream from said heater means to said second location.

7. The heating apparatus according to claim 5, wherein a divider baffle is positioned parallel to and spaced from a wall of said heating compartment, and wherein said air flow means comprises an air fan having its plane of rotation disposed parallel to said divider panel and being rotatably supported within said heating compartment, and said air fan having means for drawing two air streams thereinto in opposite axial directions and for centrifugally ejecting and mixing the two air streams within said heating compartment in the spaced between said divider baffle and said heating compartment wall.

8. The heating apparatus according to claim 5, wherein said heater means is a gas combustion element, and said air stream transported from said heater means to said second location contains gas combustion products, and wherein said heated air stream is mixed with said recirculated forced air flow solely within said heating compartment by said air flow means.

9. The improvement according to claim 5, wherein said heater means is an electric resistance element, and wherein said heated air stream is mixed with said recirculated forced air flow solely within said heating compartment by said air flow means.

10. In a forced air heating apparatus having an outer housing formed of a plurality of connected side, bottom, top and rear walls, and having an open front heating compartment contained therein and spaced from at least one wall of said outer housing to form an air conduit enabling circulation of a heated air stream between said outer housing and said heating compartment, and having a cover door arranged to close the open front of said heating compartment; the improvement comprising:

a dual air flow fan rotatably supported within said heating compartment, said fan having means for drawing two air streams thereinto along opposite axial directions and for impelling both air streams centrifugally away from said fan during rotation thereof to enable mixing of said two air streams within said heating compartment, said air flow fan enabling establishment of a recirculated forced air flow internally within said heating compartment and enabling the drawing of said heated air stream from said air conduit into a portion of said heating compartment.

11. The improvement according to claim 10, wherein a divider baffle is positioned parallel to and spaced from one of the walls of said heating compartment, said divider baffle having first and second heated air flow channels formed between at least two of the edge portions thereof and the adjacent wall portions of said heating compartment, and said divider panel having an aperture form therein and aligned with the axis of said air flow fan for enabling recirculated forced air flow within said heating compartment, and wherein said dual air flow fan is positioned between said divider baffle and said heating compartment wall.

12. The improvement according to claim 10, wherein a heater means is provided for heating an intake ambient air stream at a first location in said air conduit, and wherein said air conduit enables transport of a heated air stream from said heater means to a second location which is in flow communication with said heating compartment.

13. The improvement according to claim 10, wherein said air fan has first and second axial intakes located on opposite sides thereof and first and second sets of centrifugal outflow vanes associated therewith for enabling the simultaneous inflow and mixing of two air streams at the peripheral edge of said fan, and a rotational motive means connected to said air fan for enabling rotation thereof and establishment of an air stream movement through said air conduit and across said air heater means and for enabling the establishment of a recirculated forced air flow within said heating compartment, said air fan enabling the intermixture of said heated air stream and said recirculated force air flow solely within said heating compartment.

14. The improvement according to claim 10, wherein said heater means is a gas combustion element, and said heated air stream transported through said air conduit contains gas combustion products.

15. A dual air flow fan for circulation of heated air in a forced air heating apparatus having a separate heating compartment and an associated air conduit means having an entry connected thereto for enabling an inflow of heated air, said air flow fan located within said heating compartment at the entry of said air conduit means thereto, said dual air flow fan comprising a shaft collar, a circular center plate rigidly connected to said shaft collar, a first and a second set of impeller blades affixed perpendicularly on opposite edge portions of said center plate, said impeller blades curved with respect to the direction of rotation to enable centrifugal ejection of two air streams, one flowing along the fan axis in a first direction and a second flowing along the fan axis in an opposite direction both inwardly toward said center plate, said first set of impeller blades operable for drawing a heated air stream through the entry of said associated air conduit means and into contact therewith along the fan axis at the entry of the air stream into said separate heating compartment, said second set of impeller blades operable for forcibly recirculating heated air within said heating compartment, said dual air flow fan enabling the simultaneous inflow and outward mixing of two air streams at the peripheral edge thereof.

16. The dual air flow fan according to claim 15, wherein said first and second set of impeller blades are affixed to said center plate on opposite faces thereof about the peripheral edge portion, and wherein a first and a second reinforcement rings are connected to the outside ends of said impeller blade sets.

17. The dual flow air fan according to claim 15, wherein said collar means contains adjustment and securing means for locking the same on to a motor shaft.

18. The method of operating a forced air heating apparatus having a heating compartment and an associated air conduit means connected between a heater means and the heating compartment, and said heating compartment having an air fan means for enabling inflow of a heated air stream into the heating compartment and establishment of a recirculated forced air flow substantially internally within the heating compartment and for enabling mixing of the recirculated air flow with the heated air stream transported within the air conduit; comprising the steps of:

heating an intake ambient air stream at a first location within the conduit means, transporting the heated air stream from the heater means to a second location within the air conduit, drawing the heated air stream into contact with the air fan means at its entry into the heating compartment, simultaneously recirculating a forced air flow within said heating compartment, mixing the heated air stream with the recirculated forced air flow within a portion of the heating compartment, and venting the mixed air flow established within the heating compartment to a flue outlet.

19. The method according to claim 18, comprising the additional step of:

controlling the flow of the heated air stream within the air conduit to enable variable proportions of the mixture of the heated air stream with the recirculated forced air flow within the heating compartment.

20. The method according to claim 18, wherein said heating step is carried out by drawing the intake ambient air stream across a gas combustion element wherein the gas combustion products are mixed with the heated ambient air stream.

21. The method according to claim 18, wherein said heating step is carried out by contacting the intake ambient air stream with an electric resistance heating element located within the associated air conduit means.

22. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heated air stream from said heater means into said heating compartment at a second location, air flow means for enabling establishment of a recirculated forced air flow internally within said heating compartment and for drawing said heated air stream into a portion of said heating compartment without entry of said internal forced air flow into said air conduit, an air valve means located within said air conduit means to enable variable flow of said heated air stream into said heating compartment, and vent means formed in said heating compartment to enable the outflow of heated air from said heating compartment.

23. The improvement according to claim 22, wherein said valve means is positioned within said air conduit means adjacent to said second location.

24. The improvement according to claim 22 wherein said valve means comprises a baffle pivotally connected within said air conduit means, and wherein said baffle is connected to an adjustment means having an operator means associated therewith.

25. The improvement according to claim 22, wherein said air conduit means is connected in communication with a flue outlet positioned adjacent to said second location, and wherein said valve means is arranged to selectively and variably close said air conduit means and said flue outlet.

26. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heated air stream from said heater means into said heating compartment at a second location, air flow means for enabling establishment of a recirculated forced air flow internally within said heating compartment and for drawing said heated air stream into a portion of said heating compartment without entry of said internal forced air flow into said air conduit, said air flow means comprising a dual air flow fan rotatably supported within a portion of said heating compartment, and said fan having means for drawing two air streams thereinto along opposite axial directions and for impelling both air streams centrifugally away from said fan during rotation thereof, and vent means formed in said heating compartment to enable the outflow of heated air from said heating compartment.

27. The improvement according to claim 26, wherein said dual air flow fan comprises a shaft collar, a circular center plate rigidly connected to said shaft collar, a first and a second set of impeller blades affixed perpendicularly on opposite faces of said center plate, said impeller blades curved with respect to the direction of rotation to enable the centrifugal forced intake of two air streams, one flowing along the fan axis in a first direction and a second air stream flowing along the fan axis in the opposite direction both inwardly toward said center plate.

28. The improvement according to claim 26, wherein a divider baffle is positioned parallel to and spaced from one wall of said heating compartment, and wherein said dual air flow fan is positioned within the space thus formed.

29. A forced air heating apparatus having a heating compartment and an associated air conduit means connected thereto, comprising heater means for heating an intake ambient air stream drawn into said conduit means at a first location, said conduit means enabling transport of a heated air stream from said heater means into said heating compartment at a second location, air flow means for enabling establishment of a recirculated forced air flow substantially internally within said heating compartment and for drawing said heated air stream into a portion of said heating compartment without entry of said internal forced air flow into said air conduit means, an air valve means located within said air conduit means to enable variable flow of said heated air stream into said heating compartment, and vent means formed in said heating compartment to enable the outflow of heated air from said heating compartment.

30. The heating apparatus according to claim 29, wherein said air conduit means is connected in communication with a flue outlet positioned adjacent to said second location, and wherein said valve means is arranged to selectively and variably close said air conduit means and said flue outlet.

31. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heated air stream from said heater means into said heating compartment at a second location, air flow means for enabling establishment of a recirculated forced air flow internally within said heating compartment and for drawing said heated air stream into a portion of said heating compartment without entry of said internal forced air flow into said air conduit, said air flow means comprising an air fan rotatably supported within said heating compartment, and said air fan having means for drawing two air streams thereinto along opposite axial directions and for centrifugally ejecting and mixing the two air streams within said heating compartment, said two air streams comprising said heated air stream and said recirculated forced air flow, and vent means formed in said heating compartment to enable the outflow of heated air from said heating compartment.

32. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heated air stream from said heater means into said heating compartment at a second location, air flow means for enabling establishment of a recirculated forced air flow internally within said heating compartment and for drawing said heating air stream into a portion of said heating compartment without entry of said internal forced air flow into said air conduit, a divider baffle positioned parallel to and spaced from a wall of said heating compartment, said air flow means comprising an air fan having its plane of rotation disposed parallel to said divider panel and being rotatably supported within said heating compartment, and said air fan having means for drawing two air streams thereinto along opposite axial directions and for centrifugally ejecting and mixing the two air streams within said heating compartment in the space between said divider baffle and said heating compartment wall, and vent means formed in said heating compartment to enable the outflow of heated air from said heating compartment.

33. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heater air stream from said heater means into said heating compartment at a second location, air flow means for enabling establishment of a recirculated forced air flow internally within said heating compartment and for drawing said heated air stream into a portion of said heating compartment without entry of said internal forced air flow into said air conduit, said air conduit means connected to a heat collector duct at a position contiguous to said second location, and said heat collector duct enabling circulation of said heated air stream into said air flow means, and vent means formed in said heating compartment to enable the outflow of heated air from said heating compartment.

34. In a forced air heating apparatus having a heating compartment and an associated air conduit means connected thereto; the improvement comprising heater means disposed within said conduit means for heating an intake ambient air stream drawn into said conduit means at a first location, said conduit means enabling transport of a heated air stream from said heater means into said heating compartment at a second location, air flow means for enabling establishment of a recirculated forced air flow internally within said heating compartment and for drawing said heated air stream into a portion of said heating compartment without entry of said internal forced air flow into said air conduit means, said air conduit means comprising flueways located adjacent to a plurality of the outer walls of said heating compartment and a heated air chamber connected to said flueways and extending therefrom into said second location for enabling heat exchange from said flueways and from said heated air chamber into said heating compartment indirectly through the walls thereof, and vent means formed in said heating compartment to enable the outflow of heated air from said heating compartment.

35. A forced air heating apparatus having a heating compartment and an associated air conduit means connected thereto, comprising heater means for heating an intake ambient air stream drawn into said conduit means at a first location, said conduit means enabling transport of a heated air stream from said heater means into said heating compartment at a second location, air flow means for enabling establishment of a recirculated forced air flow substantially internally within said heating compartment and for drawing said heated air stream into a portion of said heating compartment without entry of said internal forced air flow into said air conduit means, said air flow means comprising an air fan rotatably supported within said heating compartment, and said air fan having means for drawing two air streams thereinto in opposite axial directions and for centrifugally ejecting and mixing the two air streams within said heating compartment, said two air streams comprising said heated air stream and said recirculated forced air flow, and vent means formed in said heating compartment to enable the outflow of heated air from said heating compartment.

36. A forced air heating apparatus having a heating compartment and an associated air conduit means connected thereto, comprising heater means for heating an intake ambient air stream drawn into said conduit means at a first location, said conduit means enabling transport of a heated air stream from said heater means into said heating compartment at a second location, air flow means for enabling establishment of a recirculated forced air flow substantially internally within said heating compartment and for drawing said heated air stream into a portion of said heating compartment without entry of said internal forced air flow into said air conduit means, said air conduit means connected to a heat collector duct at a position contiguous to said second location, and said heat collector duct enabling circulation of said heated air stream into said air flow means, and vent means formed in said heating compartment to enable the outflow of heated air from said heating compartment.

37. A forced air heating apparatus having a heating compartment and an associated air conduit means connected thereto, comprising heater means for heating an intake ambient air stream drawn into said conduit means at a first location, said conduit means enabling transport of a heated air stream from said heater means into said heating compartment at a second location, air flow means for enabling establishment of a recirculated forced air flow substantially internally within said heating compartment and for drawing said heated air stream into a portion of said heating compartment without entry of said internal forced air flow into said air conduit means, said air conduit means comprising flueways located adjacent to a plurality of the outer walls of said heating compartment and a heated air chamber connected to said flueways and extending therefrom into said second location for enabling heat exchange from said flueways and from said heated air chamber into said heating compartment indirectly through the walls thereof, and vent means formed in said heating compartment to enable the outflow of heated air from said heating compartment.

* * * * *